United States Patent
Hoyer et al.

(10) Patent No.: US 6,367,240 B1
(45) Date of Patent: Apr. 9, 2002

(54) AIR MANIFOLD SYSTEM

(75) Inventors: James C. Hoyer; Gregg H. Wilson, both of Cincinnati; Ronald C. Beatty, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/213,401

(22) Filed: Dec. 16, 1998

Related U.S. Application Data

(60) Provisional application No. 60/090,141, filed on Jun. 22, 1998.

(51) Int. Cl.⁷ ............................... F02C 6/08; F02C 7/20
(52) U.S. Cl. ..................................... 60/39.07; 60/39.32
(58) Field of Search ............................. 60/39.31, 39.32, 60/39.07, 39.093

(56) References Cited

U.S. PATENT DOCUMENTS

| | | | |
|---|---|---|---|
| 3,768,251 A | * 10/1973 | Camboulives et al. ..... 60/39.32 |
| 3,777,489 A | 12/1973 | Johnson et al. | |
| 4,412,782 A | * 11/1983 | Monsarrat ................... 415/175 |
| 4,715,779 A | 12/1987 | Suciu | |
| 4,928,483 A | 5/1990 | Le Fort et al. | |
| 5,100,291 A | * 3/1992 | Glover ...................... 60/39.75 |
| 5,286,071 A | * 2/1994 | Storage ...................... 285/261 |
| 5,351,473 A | 10/1994 | Shuba | |
| 5,399,066 A | 3/1995 | Ritchie et al. | |
| 5,611,577 A | * 3/1997 | Meyer et al. ................ 285/261 |
| 5,782,077 A | 7/1998 | Porte | |

FOREIGN PATENT DOCUMENTS

EP 743435 A1 9/1999

* cited by examiner

*Primary Examiner*—Ted Kim
(74) *Attorney, Agent, or Firm*—Andrew C. Hess; Nathan D. Herkamp

(57) ABSTRACT

Air collecting manifold for a gas turbine engine including a plurality of arcuate pipe segments surrounding a compressor casing receives air from a system of feed tubes incorporating spherical ball joints to allow for differential thermal growth and limit transmission of vibration from one component of the manifold structure to another.

2 Claims, 3 Drawing Sheets

AIR MANIFOLD SYSTEM

REFERENCE TO RELATED APPLICATIONS

This application claims the benefit of United States Provisional Patent Application, Ser. No. 60/090,141, filed on Jun. 22, 1998.

BACKGROUND OF THE INVENTION

The invention relates generally to gas turbine engines and, more particularly, to a manifold system for collecting air from one location of a gas turbine engine for use at another location.

In the gas turbine engine, and particularly in the aircraft engine, art it is known to extract air from the compressor section of the engine for use elsewhere in the engine or the aircraft, for example for providing high pressure air to the aircraft wing anti-icing system.

Various structures have been employed in the prior art to collect air from compressor stages. Typically, air is obtained from certain compressor stages and supplied to a manifold comprising a system of pipe segments surrounding the compressor casing. The manifold system is attached to the exterior of the gas turbine at the axial location of the compressor stage from which compressor air is to be extracted.

One significant limitation of the prior art manifold system construction is that the structure mounting the manifold to the compressor casing is subjected to substantial vibration cycles and temperature gradients during various parts of the flight cycle, resulting in build up of substantial stresses in the mount structures fastening the manifold apparatus to the compressor casing. These stresses can result in fatigue cracking in the mount structures and the manifold system itself, requiring early removal and replacement of manifold hardware at substantial cost in hardware and lost availability of the aircraft to the operator.

SUMMARY OF THE INVENTION

Accordingly, the present invention includes an air collecting manifold apparatus for a gas turbine engine having a supply tube surrounding a compressor casing configured as a plurality of generally circumferentially extending arcuate pipe segments disposed around the a compressor casing and connected to a system for distributing the air, for example to the aircraft wing anti-icing apparatus. The supply tube receives air from a system of feed tubes incorporating a plurality of flexible joints which allow for differential thermal growth and limit transmission of vibration from one component of the manifold structure to another.

BRIEF DESCRIPTION OF THE DRAWINGS

The present invention is illustrated by way of detailed example in the Figures of the accompanying drawing in which like reference numerals refer to like elements throughout, and in which.

DESCRIPTION OF THE PREFERRED EMBODIMENTS

Figure 1:
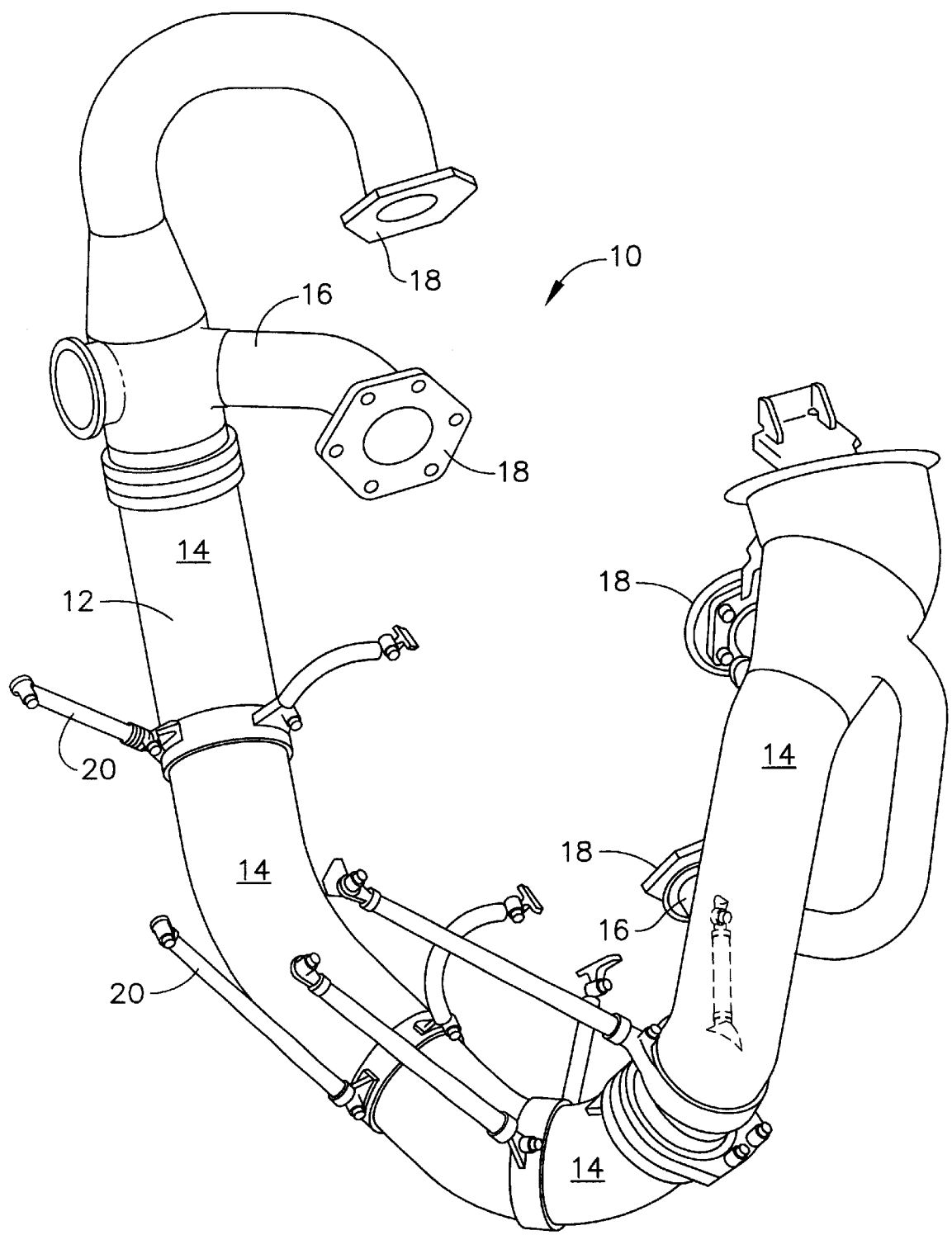
FIG. 1 is a schematic perspective view of a prior art manifold structure.

A typical manifold system 10, shown in FIG. 1 includes a supply tube 12 surrounding a compressor casing 60 (FIG. 3) configured as a plurality of generally circumferentially extending arcuate pipe segments 14 disposed around the compressor casing. The supply tube 12 receives air from a plurality of compressor discharge ports 62 (FIG. 3) collecting air from the interior of the compressor casing 60. The supply tube 12 is connected to the pipe by several generally radially extending feeder tubes 16 each of which is connected at one end to the pipe segment 14 and at the other end to its respective compressor discharge port 62. Flanges 18 are attached to the pipe segments 14 by typically welding to allow the manifold 10 to be fastened to the compressor casing 60. The pipe segments 14 are additionally connected to the casing 60 by a plurality of support links 20. The relative thermal growth of the mount hardware and the manifold tubing result in severe stresses being applied to the welds at the connection to the flanges 18 and at weld joints in the tubing structure itself.

Figure 2:
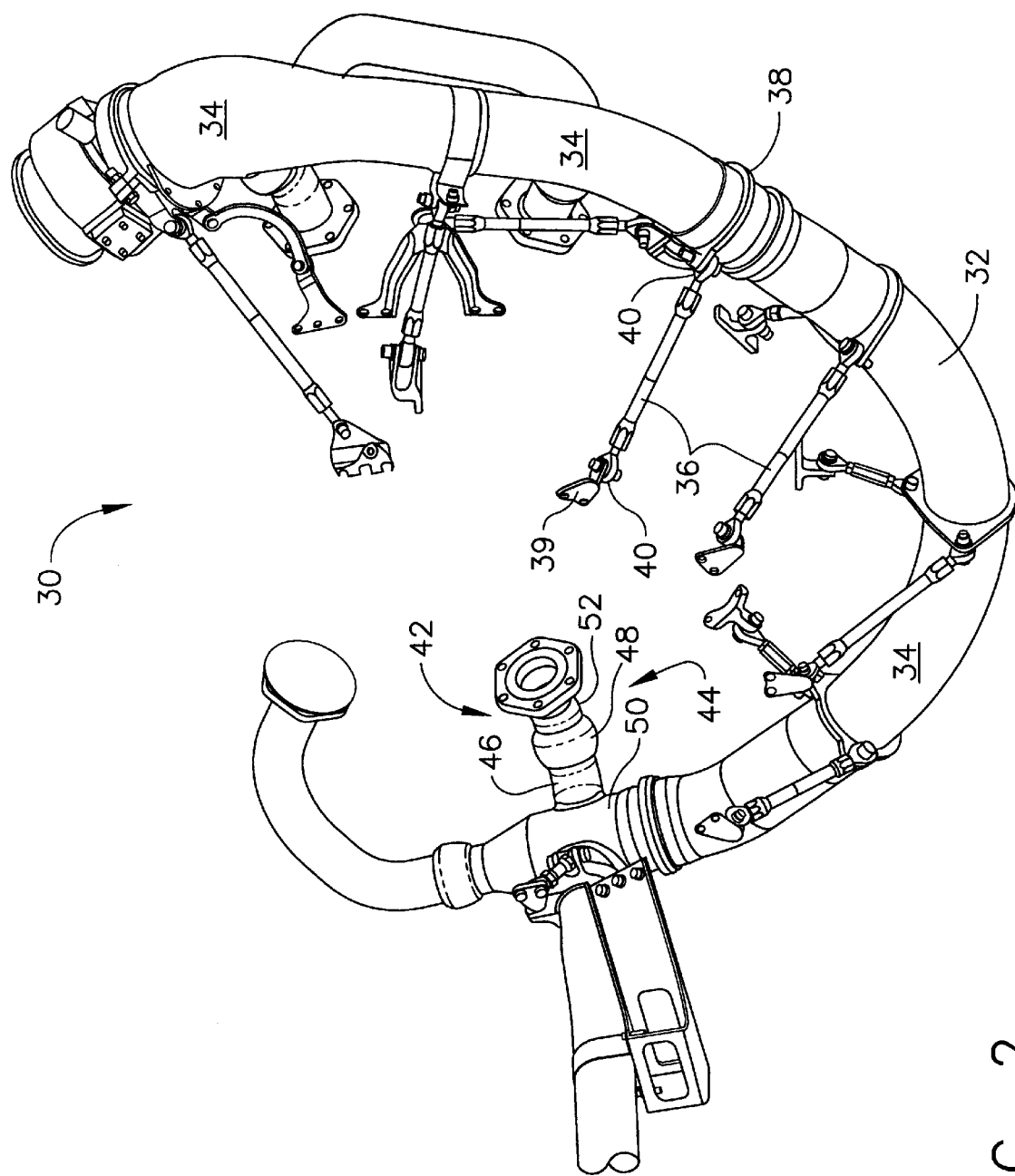
FIG. 2 is a schematic perspective view illustrating a cooling manifold built in accordance with the present invention.
Figure 3:
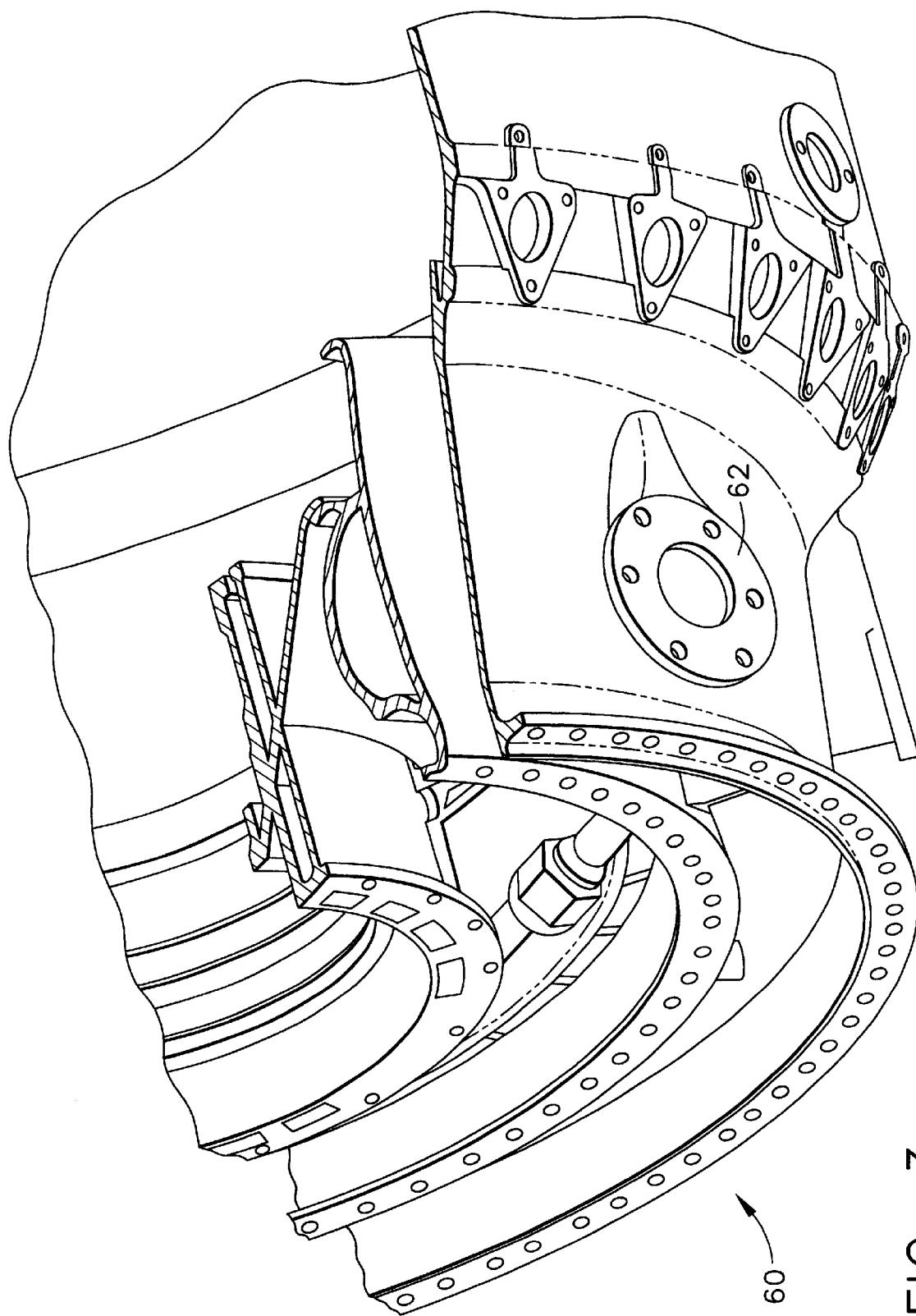
FIG. 3 is a schematic partial perspective view of a compressor casing to which the present invention can be attached.

In the present invention, illustrated schematically in FIG. 2, an air collecting manifold apparatus 30 for a gas turbine engine includes a supply tube 32 surrounding a compressor casing 60, as shown in FIG. 3, configured as a plurality of generally circumferentially extending arcuate pipe segments 34 disposed around the a compressor casing 60 and connected to a system for distributing the air, for example to the aircraft wing de-icing system. Support links 36 connect the collars 38 which surround the circumferentially extending pipes 34 to attachment points on the compressor casing via brackets 39. The links 36 have flexible joints 40 (typically rod end bearings) to allow rotation of the support and are fastened to collars 38 surrounding the pipe segments 34.

Whereas in the prior art the manifold system typically derives at least a part of its mechanical support from the mounting flanges of the pipe segments themselves, in the present invention the manifold system is mechanically supported by the support links 36. In the present invention the support links 36 are arranged in a fashion similar to a spoked wheel. Because of the nature of the flexible joints 40, the support links 36 provide mechanical support to the manifold system while still allowing the supply tube 32 to flex. This system of support links eliminates the loads that would ordinarily be placed on the mounting flanges of the manifold 30. This in turn eliminates the loads from the tubing ball joints 48, which allows the use of smaller, lighter ball joints 48 than would otherwise be required.

The supply tube 32 receives air from a plurality of compressor discharge ports 62 collecting air from the interior of the compressor casing. The supply tube is connected to the pipe by several feeder systems 42. Each feeder system 42 includes a generally radially extending tube 44 connected in flow communication at one end to a pipe segment 34 and at the other end to its respective discharge port 62. Each tube includes a first tube section 46 fitted at one end to a port 50 in the pipe segment 34 and connected at the other end to a generally spherical ball joint 48 and a second tube section 52 connected at one end to the discharge port 62 and at the other end to the generally spherical ball joint 48, such as the type of ball joint described in U.S. Pat. No. 5,611,577, issued Mar. 18, 1997, to Meyer, et al., and assigned to the assignee of the present invention.

The supply tube 32 may be terminated at each of its respective circumferential ends or one or both ends may be connected via an additional feeder system 42 to a respective discharge port 62.

The ball joint configuration allows the radially extending tubes 44 to flex to allow for differential thermal growth of the tubes 44 and the supply tube 32 which is spaced from the compressor casing 60 a larger distance than the radial tubes 44. Each of the tubes 44 is connected at its radially inner end to the compressor casing 60 which is hot relative to the ambient air, and at its radially outer end to a pipe segment 34 located at a larger distance from the hot compressor casing 60. This temperature difference causes the tube 44 to flex as the casing expands more quickly than the cooler pipes. The shifting relative to the casing places stresses on the tubes 44 and the mount structures 39. The ball joints 48 in the radial tubing 44 reduce significantly the transmission of forces to the pipes 34, which consequently exert substantially reduced forces on the mount links 36 and brackets 39.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true sprit and scope of the invention.

What is claimed is:

1. A manifold system for a gas turbine engine for receiving air from a plurality of discharge port, in a compressor casing, comprising:

a plurality of generally circumferentially extending, arcuate pipe segments disposed radially outside and around the exterior of a compressor casing;

a plurality of feeder systems connected to said pipe segments, each of said feeder systems comprising:

a generally radially extending tube connected in flow communication at a respective first radially outer end to a port in said pipe segment and a radially inner end connected in flow communication to a respective one of said plurality of discharge ports, said radially extending tube comprising a first outer tube section and a second inner tube section connected to each other by a generally spherical ball joint, wherein said ball joints reduce the transmission of forces between said plurality of pipe segments and said compressor casing;

a plurality of support collars surrounding each of said pipe segments; and a plurality of support links connected at one end thereof to a respective one of said collars and at the other end thereof to a respective one of a plurality of attachment points on said compressor casing, wherein said links include a flexible joint at each end, wherein a pair of said support links are connected at their radially outer ends to a respective one of said support collars, said outer ends being spaced apart a first distance, and at the opposite ends thereof to a pair of said attachment points which are spaced apart a second distance, wherein said second distance is greater than said first distance, wherein the manifold system is mechanically supported by said plurality of support links.

2. A manifold system for a gas turbine engine for receiving air from a plurality of discharge ports in a casing, comprising:

a plurality of generally circumferentially extending, arcuate pipe segments disposed radially outside and around the exterior of a casing;

a plurality of feeder systems connected to said pipe segments, each of said feeder systems comprising:

a generally radially extending tube connected in flow communication at a respective first radially outer end to a port in said pipe segment and a radially inner end connected in flow communication to a respective one of said plurality of discharge ports, said radially extending tube comprising a first outer tube section and a second inner tube section connected to each other by a generally spherical ball joint, wherein said ball joints reduce the transmission of forces between said plurality of pipe segments and said casing;

a plurality of support collars surrounding each of said pipe segments; and a plurality of support links connected at one end thereof to a respective one of said collars and at the other end thereof to a respective one of a plurality of attachment points on said casing, wherein said links include a flexible joint at each end, wherein a pair of said support links are connected at their radially outer ends to a respective one of said support collars, said outer ends being spaced apart a first distance, and at the opposite ends thereof to a pair of said attachment points which are spaced apart a second distance, wherein said second distance is greater than said first distance, wherein the manifold system is mechanically supported by said plurality of support links.

* * * * *